J. A. DODGE & W. H. & H. S. STEVENSON.
Harvester Rake.
No. 67,853.
Patented Aug. 20, 1867.
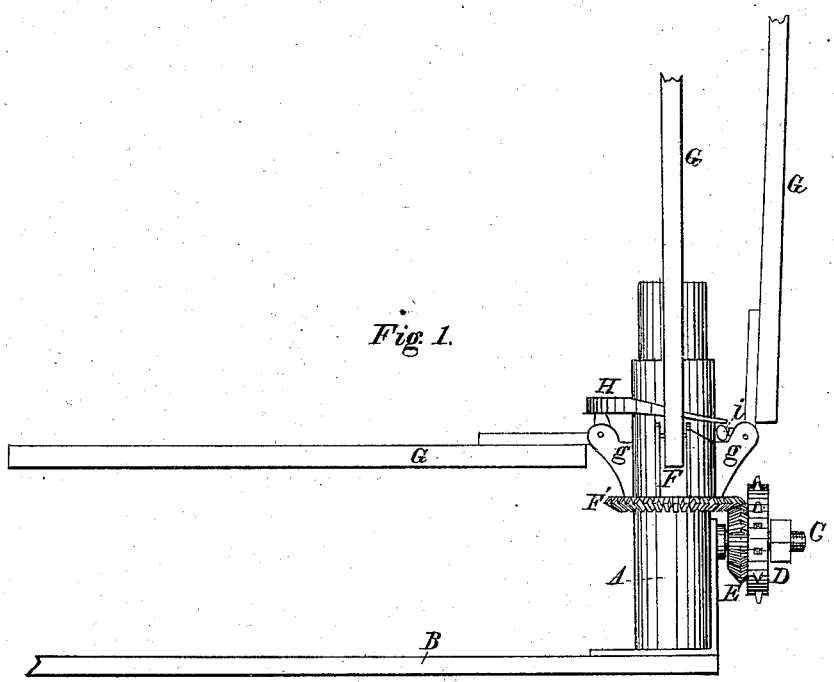
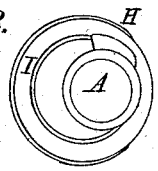
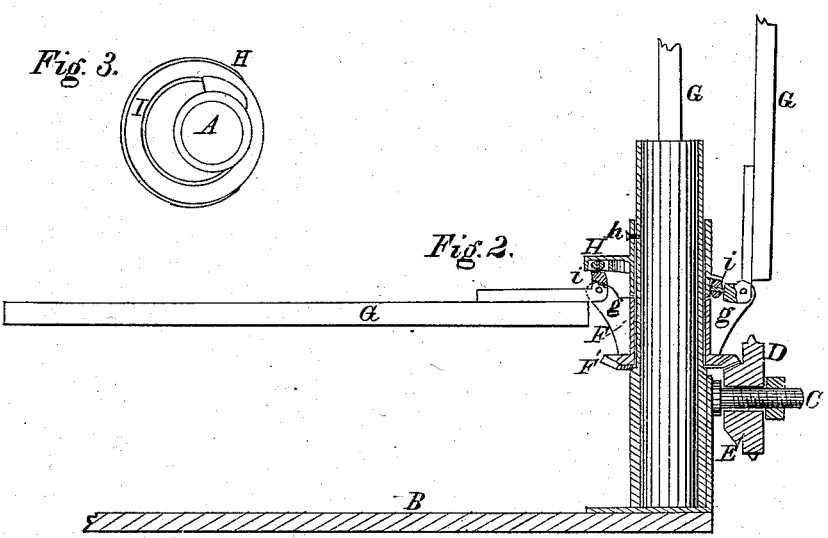

United States Patent Office.

JOHN A. DODGE, WILLIAM H. STEVENSON, AND HOWARD S. STEVENSON, OF AUBURN, NEW YORK.

Letters Patent No. 67,853, dated August 20, 1867.

---

IMPROVEMENT IN HARVESTER-RAKES.

---

*The Schedule referred to in these Letters Patent and making part of the same.*

---

TO ALL WHOM IT MAY CONCERN:

Be it known that we, JOHN A. DODGE, WILLIAM H. STEVENSON, and HOWARD S. STEVENSON, all of Auburn, in the county of Cayuga, and State of New York, have invented certain new and useful Improvements in Harvester-Rakes, of which the following is a full, clear, and exact description, reference being had to the accompanying drawings, which make part of this specification, and in which—

Figure 1 represents a view in elevation of so much of a harvester as is necessary to illustrate our invention, as seen from the front.

Figure 2, a vertical central section through the rake-post parallel to the finger-beam, and Figure 3 a view of the under side of the stationary cam-groove, which controls the rake and beater-arms.

Our invention relates to that class of harvester-rakes in which a series of combined rake and reel-arms revolves continuously around an upright shaft; and our improvements consist, first, in combining a fixed rake-post with a travelling collar carrying a series of combined rake and reel-arms, and a cam-guide fixed on the post; second, in so combining a series of independent combined rake and reel-arms, with a collar rotating on a fixed post, that the collar and raking and reeling mechanism may be removed by detaching the cam-guide from the post.

In the accompanying drawings, which show a convenient arrangement of parts for carrying out the objects of our invention, a tubular stationary rake-post, A, is shown as mounted on the heel of a finger-beam, B. An arm or spindle, C, projects from this post and carries a bevel-pinion, E, and a sprocket-wheel, D, both turning together loosely on it. This sprocket-wheel is to be driven by a chain from the main axle. The pinion E drives a corresponding one, F', on a collar, F, which rotates around the rake-post A. The rake and beater-arms G are pivoted to play vertically in bearings or brackets $g$, projecting from the collar F. They are bent up at their rear ends, which are provided with friction-rollers $i$, travelling in a properly-shaped cam-groove, I, fig. 3, on the under side of a stationary flanged thimble, H, which slips over the tubular post A, and is fastened by a pin, $h$, fig. 2, or other suitable means.

By our improvements, as above described, we secure a large bearing surface for the collar, and the cam-groove is protected; the parts can also readily be removed or replaced, as, by removing the pin $h$ from the thimble H, the cam-ring, collar F, and pinion F', together with the rake and reel-arms, can be taken off. The cam-groove is so shaped as to cause the arms, as they successively revolve round to the front, to descend into the standing grain and press it back against the cutters; it falls upon the platform and is swept off by the rake. The arms, after passing over the platform, rise and move forward in a position nearly vertical, until ready to descend into the grain.

Our invention is applicable to either one or two-wheeled machines, with either rigid or jointed finger-beams, and the rake, (especially on machines having rigid finger-beams,) might be driven by gearing instead of by a chain. By turning the cam-groove on the post the throw of the rake may be varied; and the rake may be adapted to be used with a common reel.

What we claim as new, and desire to secure by Letters Patent, is—

1. The combination, substantially as described, of the combined rake and reel-arms, with the collar, the cam-groove, and the fixed rake-post.

2. The combination, substantially in the manner described, of the cam-guide and rake-post, whereby the flanged-collar, to which the raking and reeling mechanism is attached, can be removed by detaching the cam-guide from the rake-post.

In testimony whereof we have hereunto subscribed our names.

JOHN A. DODGE,
WM. H. STEVENSON,
HOWARD S. STEVENSON.

Witnesses:
A. C. MUNGER,
G. M. PATTEN.